United States Patent
Oddsen, Jr.

(10) Patent No.: US 6,719,253 B2
(45) Date of Patent: Apr. 13, 2004

(54) CHANNEL FOR AN ARM APPARATUS FOR MOUNTING ELECTRONIC DEVICES WITH CABLE MANAGEMENT SYSTEM

(75) Inventor: Odd N. Oddsen, Jr., Easton, PA (US)

(73) Assignee: Innovative Office Products, Inc., Easton, PA (US)

(*) Notice: Subject to any disclaimer, the term of this patent is extended or adjusted under 35 U.S.C. 154(b) by 0 days.

(21) Appl. No.: 10/305,566

(22) Filed: Nov. 27, 2002

(65) Prior Publication Data

US 2003/0080268 A1 May 1, 2003

Related U.S. Application Data

(62) Division of application No. 10/079,804, filed on Feb. 20, 2002, which is a division of application No. 09/406,006, filed on Sep. 24, 1999, now Pat. No. 6,409,134.
(60) Provisional application No. 60/138,120, filed on Jun. 7, 1999.

(51) Int. Cl.[7] ................................................. E04G 3/00
(52) U.S. Cl. ........................ 248/274.1; 248/278.1; 248/282.1; 248/284.1; 248/280.11
(58) Field of Search ................. 248/274.1, 298.1, 248/284.1, 291.1, 276.1, 286.1, 240, 280.11

(56) References Cited

U.S. PATENT DOCUMENTS

| | | | |
|---|---|---|---|
| 999,283 A | 8/1911 | White | |
| 3,131,900 A | 5/1964 | Anderson et al. | |
| 3,409,261 A | * 11/1968 | Leporati | 248/586 |
| 3,424,419 A | 1/1969 | Siegel | |
| 3,489,383 A | 1/1970 | Anson | |
| 4,266,747 A | 5/1981 | Souder, Jr. et al. | |
| 4,494,177 A | 1/1985 | Matthews | |
| 4,687,167 A | 8/1987 | Skalka et al. | |
| 4,695,024 A | 9/1987 | Haven | |
| 4,708,312 A | 11/1987 | Rohr | |
| 4,744,019 A | * 5/1988 | Krogsrud | 362/402 |
| 4,768,744 A | 9/1988 | Leeds et al. | |
| 4,770,384 A | 9/1988 | Kuwazima et al. | |
| 4,821,159 A | 4/1989 | Pike | |
| 4,826,123 A | * 5/1989 | Hannah et al. | 248/248 |
| 4,852,500 A | 8/1989 | Ryburg et al. | |
| 4,852,842 A | 8/1989 | O'Neill | |
| 5,123,621 A | 6/1992 | Gates | |
| 5,174,531 A | 12/1992 | Perakis | |
| 5,390,685 A | 2/1995 | McCoy | |
| 5,437,427 A | 8/1995 | Johnson | |
| 5,584,596 A | 12/1996 | Greene | |
| 5,642,819 A | 7/1997 | Ronia | |
| 5,664,750 A | 9/1997 | Cohen | |
| 5,743,503 A | 4/1998 | Voeller et al. | |
| 5,826,846 A | * 10/1998 | Buccieri et al. | 248/280.11 |
| 5,924,664 A | * 7/1999 | Mileos et al. | 248/281.11 |
| 6,012,693 A | 1/2000 | Voeller et al. | |
| 6,076,785 A | 6/2000 | Oddsen, Jr. | |
| 6,179,263 B1 | 1/2001 | Rosen et al. | |
| 6,257,538 B1 | * 7/2001 | Pangborn et al. | 248/284.1 |

* cited by examiner

Primary Examiner—Anita King
(74) Attorney, Agent, or Firm—Lerner, David, Littenberg, Krumholz & Mentlik, LLP

(57) ABSTRACT

An extension arm suitable for mounting a flat-screen electronic peripheral device, such as a computer monitor or television, includes a forearm extension that has at one end a first coupling for attachment to a tilter, a platform or other means for supporting a flat-screen device and at the other end a second coupling with a slot formed therein. The extension arm also includes a pair of endcaps, each having a shaft. The shaft of the first endcap is pivotably rotatable in a support mount, such as a wall, desk or pole mount. The shaft of the second endcap is hollow and is pivotably rotatable in the second coupling of the forearm extension. The extension arm also comprises an upper channel and a lower channel. Each channel has at opposite ends integrally cast rollers which are pivotably attached to each of the endcaps. The lower channel has a cable channel formed therein. The upper and lower channels and the endcaps form an adjustable parallelogram.

12 Claims, 12 Drawing Sheets

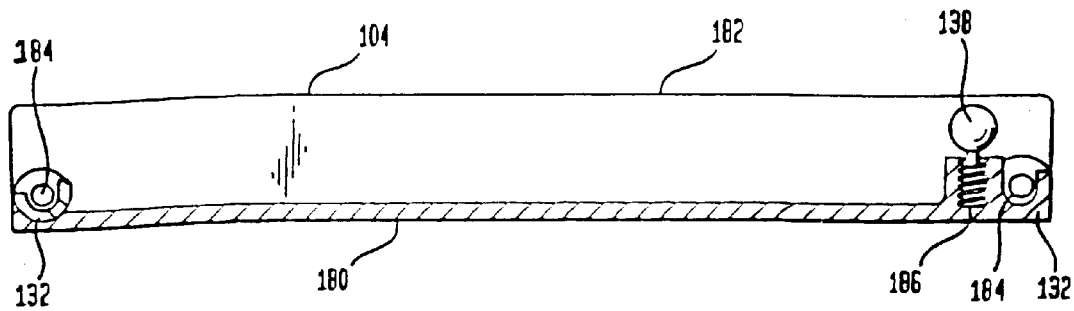
FIG. 11A
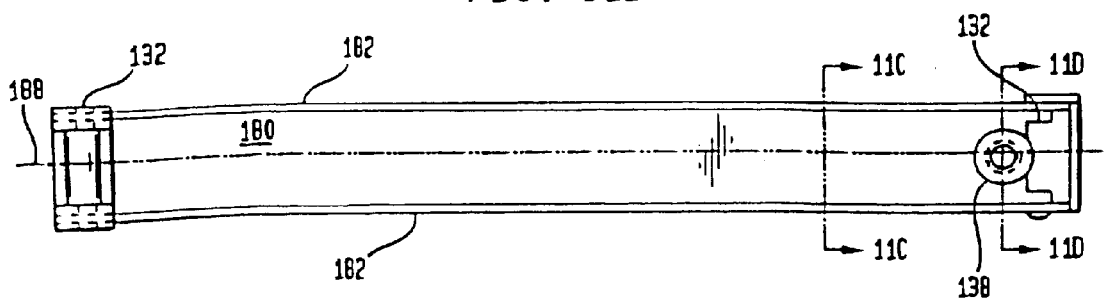
FIG. 11B
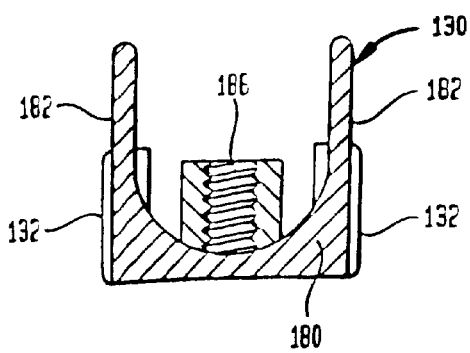 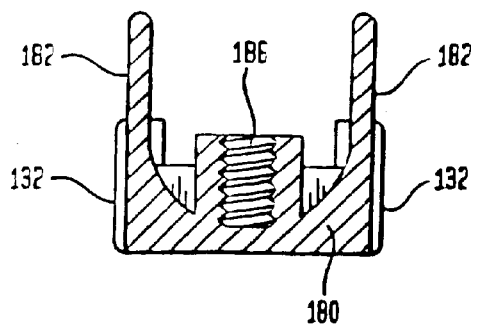
FIG. 11C  FIG. 11D

CHANNEL FOR AN ARM APPARATUS FOR MOUNTING ELECTRONIC DEVICES WITH CABLE MANAGEMENT SYSTEM

CROSS-REFERENCE TO RELATED APPLICATIONS

This patent application is a divisional application of patent application Ser. No. 10/079,804, filed Feb. 20, 2002, which is a divisional application of patent application Ser. No. 09/406,006 filed on Sep. 24, 1999, now U.S. Pat. No. 6,409,134, which claims priority under 35 U.S.C. §119(e) from Provisional Patent Application No. 60/138,120 filed on Jun. 7, 1999, the disclosures of which are incorporated herein by reference.

BACKGROUND OF THE INVENTION

This invention relates to an arm apparatus for mounting electronic devices, and more specifically to an extension arm suitable to mount a flat-screen electronic peripheral device, such as a computer monitor or a television, the extension arm having a system for managing the cables to and from the flat-screen electronic device.

Adjustable extension arms for mounting electronic peripheral devices, such as a computer monitor or a television, are well known in the prior art. However, due to recent advances in flat-screen technology, there is a demand for adjustable extension arms that are particularly suited for use with flat-screen devices, such as flat-screen computer monitors and televisions.

FIGS. 1–7 are assembly drawings of an extension arm 10 for mounting a peripheral device, in accordance with the prior art. As shown in FIG. 1, the main elements of the extension arm 10 are a first endcap 12, an upper channel 14, a lower channel 16, a second endcap 18, and a forearm extension 20. The first endcap 12 has an endcap shaft 22 that is pivotably attachable to a rigid support mount (not shown), such as an orifice sized to accept the endcap shaft 22 or a track configured and sized to engage the grooves on endcap shaft 22. The first endcap 12 is pivotably coupled via pins 24 to both the upper channel 14 and the lower channel 16. The opposite ends of the upper channel 14 and the lower channel 16 are pivotably coupled via pins 24 to the second endcap 18. The second endcap 18 is coupled to the forearm extension 20 via a forearm extension pin 92. The forearm extension 20 has a vertically disposed hole 26 therethrough for accepting a device mount (not shown) such as a tilter, platform or other apparatus. The combination of the upper and the lower channels 14, 16 and the first and the second endcaps 12, 18 form an adjustable parallelogram that permits a device coupled to the forearm extension 20 to be raised and lowered to a desirable height. The parallelogram retains its position by employing a gas spring 28, which is pivotably and adjustably attached to the first endcap 12 and the upper channel 14, as will be further described below. Generally, the gas spring 28 is sized so as to have a fixed length until an upward or downward force is exerted at the second endcap 18 that exceeds the gas spring's designed resistance. Thus, the gas spring 28 causes the parallelogram to retain its position when the only force exerted at the second endcap 18 is the weight of the device, but permits the parallelogram to be adjusted when a user pushes the device coupled to the forearm extension 20 up or down.

FIG. 2 illustrates a side view of the first endcap 12, having the endcap shaft 22 disposed on a first end 30 of the first endcap 12. To provide a rigid connection between the two pieces, the endcap shaft 22 is typically machined from steel and is inserted into the first end 30 during the casting process of the first endcap 12. The endcap shaft 22 has a hole 32 formed in an end of the endcap shaft 22 that is inserted into the first endcap 12. The first endcap 12 is typically fabricated from cast aluminum. The first endcap 12 also has a second end 34 having a hole 36 disposed therethrough. Disposed within the first endcap 12 is a threaded rod 38. A first end 40 of the threaded rod 38 is inserted into the hole 32 at the base of the endcap shaft 22. A second end 42 of the threaded rod 38 is aligned with the hole 36 and is held in place by a clip 44. The clip 44 is fastened to an inner surface of the first endcap 12 by screws 46.

Threadedly mounted on the threaded rod 38 is a clevis 48. FIG. 3 illustrates a sideview of the clevis 48 including a tapped hole 50 in the center thereof. The tapped hole 50 receives the threaded rod 38, as shown in FIG. 2. At a first end of the clevis 48 is a pair of fastening members 52, 54 to which are fastened one end of the gas spring 28. A second end 56 of the clevis 48 is configured to slidably engage a track 58 which is integrally molded in the first endcap 12 (see FIG. 2). The second end 42 of the threaded rod 38 is configured to be engaged by a hex-shaped key which is inserted through the hole 36 when the second end 42 is properly aligned with the hole 36. The hex-shaped key is employed so as to rotate the threaded rod 38 along its axis of rotation. When the threaded rod 38 is rotated along its axis of rotation, the clevis 48 moves along the length of the threaded rod 38 in a direction that corresponds to the direction which the hex-shaped key is turned. This movement of the clevis 48 permits the gas spring 28 to be adjusted.

FIGS. 4(a) and 4(b) illustrate the upper channel 14, which comprises channel bottom 60 from which extend two channel sidewalls 62. Channel bottom 60 and sidewalls 62 are typically stamped from 13 gauge steel sheet in order to give the upper channel 14 a desired degree of structural rigidity. At each of the ends of the channel bottom 60, a semi-circular region 64 of the sidewalls 62 is cut out to accommodate cold-rolled steel rollers 66, which have a hole 68 therethrough for receiving the pins 24. The rollers 66 are rigidly attached to the upper channel 14 by MIG welding along the edge of the semi-circular cut out region 64 and along the ends of the channel bottom 60.

Additionally, the upper channel 14 comprises stiffener 70, which is welded to an inner surface of the channel bottom 60. Besides providing additional structural rigidity to the upper channel 14, the stiffener 70 has a hole disposed at one end with a threaded ball stud 72 placed within the hole and fixed in place by a nut 74. The ball stud 72 is configured and sized to receive one end of the gas spring 28. The longitudinal centerline 76 of the upper channel 14 is illustrated in FIG. 4(b).

FIGS. 5(a) and 5(b) illustrate the lower channel 16 which comprises a channel bottom 78 from which extend two channel sidewalls 80. As with the upper channel 14, the channel bottom 78 and sidewalls 80 are typically stamped from 13 gauge steel sheet, which is relatively heavy in order to give the lower channel 16 a desired degree of structural rigidity. At opposite ends of the channel bottom 78, a semi-circular region 82 of the sidewalls 80 is cut out to accommodate cold-rolled steel rollers 84, which have a hole 86 therethrough for receiving the pins 24. The rollers 84 are rigidly attached to the lower channel 16 by MIG welding along the edge of the semi-circular cut out region 82 and along the ends of the channel bottom 78. The longitudinal centerline 88 of the lower channel 16 is illustrated on FIG. 5(b).

FIG. 6 illustrates the second endcap 18. Unlike the first endcap 12, the second endcap 18 does not have an endcap shaft, nor does it have a clevis assembly for attachment to the gas spring 28. Instead, the second endcap 18 has a hole 90 disposed in a bottom end for receiving the forearm extension pin 92, and a hole 94 in a side for inserting a pin 96 into the forearm extension pin 92, as illustrated in FIG. 1.

FIG. 7 illustrates the forearm extension 20 having the forearm extension pin 92 welded thereto. The forearm extension pin 92 has a hole 98 formed in an upper end to receive the pin 96. The forearm extension 20 is configured to be pivoted around the forearm extension pin 92, and is held in place within the second endcap 18 by the pin 96 which penetrates the hole 94 of the second endcap 18 and the hole 98 of the forearm extension pin 92.

Extension arms 10 of the prior art, such as the one shown in FIGS. 1–7 and others like it, are ill-suited for flat-screen monitors and televisions, in that they are bulky and cumbersome. Moreover, due to the configuration of its various parts, extension arms 10 of the prior art cannot be flattened against a mounting surface so that the entire extension arm 10 is hidden behind the flat-screen device when the device is substantially flush with the mounting surface. Furthermore, the extension arms 10 of the prior art are not designed so as to enable the cables to and from a device to be substantially hidden, and thus protected, within the extension arm 10 itself. Additionally, the extension arms 10 of the prior art are costly to manufacture and difficult to assemble.

Thus, there is a need for an extension arm suitable to mount a flat-screen electronic peripheral device, such as a computer monitor or television, that is inexpensive and easy to manufacture and assemble, that permits a flat-screen device to be mounted substantially flush with the mounting surface, and that enables the cables to and from the flat-screen device to be substantially hidden from view within the extension arm and thus protected from the elements.

SUMMARY OF THE INVENTION

The present invention, in accordance with one embodiment, relates to an extension arm suitable for mounting a flat-screen electronic peripheral device, such as a computer monitor or television. The extension arm is inexpensive and easy to manufacture and assemble, permits a flat-screen device to be mounted substantially flush with a mounting surface, and enables the cables to and from the flat-screen device to be substantially hidden from view within the extension arm.

According to one embodiment of the invention, the extension arm comprises a first and a second endcap, an upper and a lower channel, and a forearm extension. Each endcap has a shaft. The shaft of the first endcap is pivotably rotatable in a support mount, such as a wall, desk or pole mount. The shaft of the second endcap is rotatably coupled to the forearm extension.

The upper channel and the lower channel have at opposite ends integrally cast rollers. The rollers are pivotably attached to the respective endcap. The upper and lower channels and the endcaps form an adjustable parallelogram. The shape of the parallelogram is retained by a gas spring. A first end of the gas spring is attached to a ball stud mounted in the upper channel. A second end of the gas spring is adjustably mounted to the first endcap.

The forearm extension is a U-shaped channel with a first coupling disposed at one end for rotatably coupling to a tilter, a platform or other means for supporting a flat-screen device. The forearm extension has a second coupling disposed at the other end for rotatably coupling to the shaft of the second endcap.

The first endcap also includes a clevis pivotably attached to the second end of the gas spring and a threaded rod threadedly engaging the clevis, such that the clevis slides within the first endcap when the rod rotates around its axial centerline. The threaded rod is rotatably secured within the first endcap by a retainer clip and a pair of screws.

A cable can be substantially hidden from view by being disposed within the extension arm. The cable is disposed within the lower channel, the second endcap and the forearm extension. The lower channel includes a cable channel formed in a lower surface thereof so that the cable can be inserted within the lower channel. The cable is held in place within the lower channel by a cable cover which engages the cable channel. The second endcap has a hollow shaft so that the cable can be fed through the shaft to the forearm extension. The second coupling of the forearm extension has a hole in an interior wall so that the cable can be disposed through the hole and into the U-shaped channel. The cable is held within the U-shaped channel by a cable clip.

BRIEF DESCRIPTION OF THE DRAWINGS

The accompanying drawings, which are incorporated in and form a part of the specification, illustrate the embodiments of the present invention and, together with the description, serve to explain the principles of the invention.

FIGS. 11A–D illustrate several views of an upper channel, according to one embodiment of the invention;

DETAILED DESCRIPTION

Figure 1:
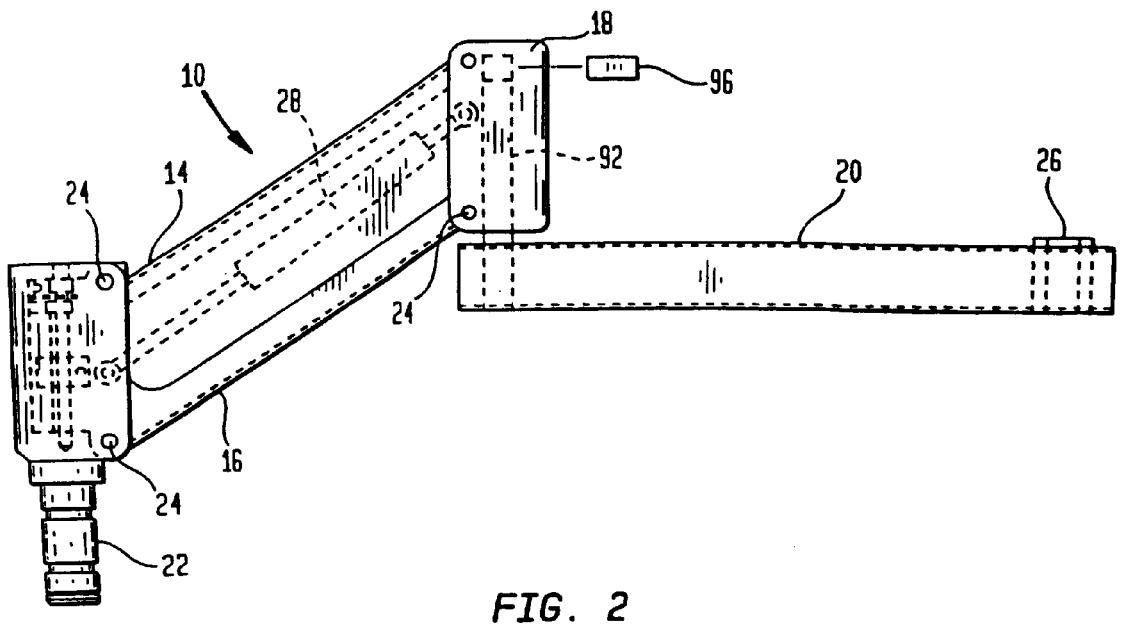
FIG. 1 is an assembly drawing of an extension arm for mounting a computer monitor, in accordance with the prior art.
Figure 2:
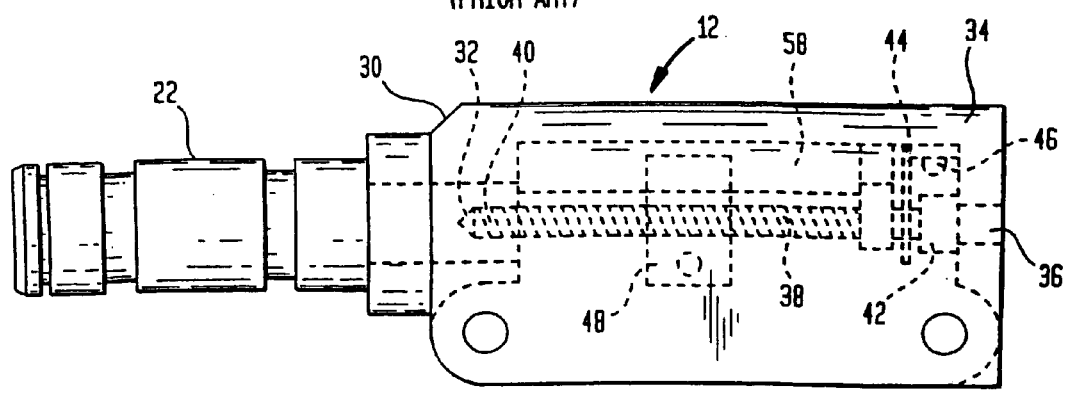
FIG. 2 illustrates a first endcap of an extension arm, in accordance with the prior art.
Figure 3:
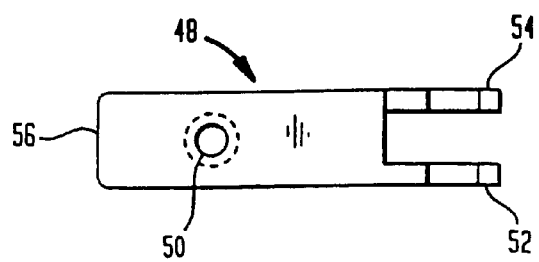
FIG. 3 illustrates the clevis assembly of an extension arm, in accordance with the prior art.
Figure 4A:
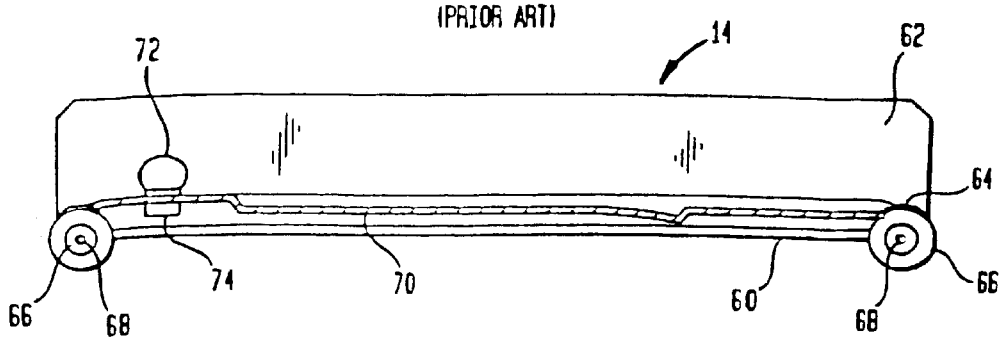
FIGS. 4a and 4b illustrate the upper channel of an extension arm, in accordance with the prior art.
Figure 4B:
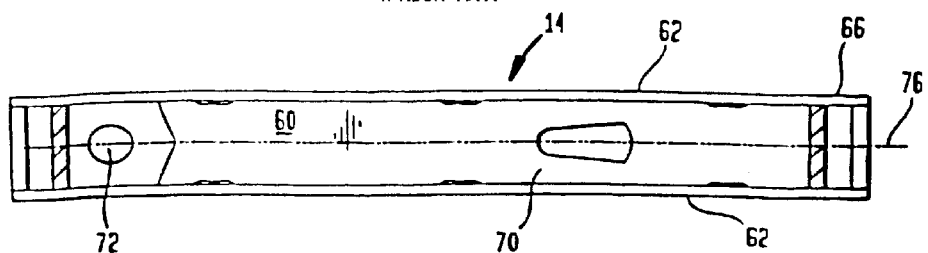
Figure 5A:
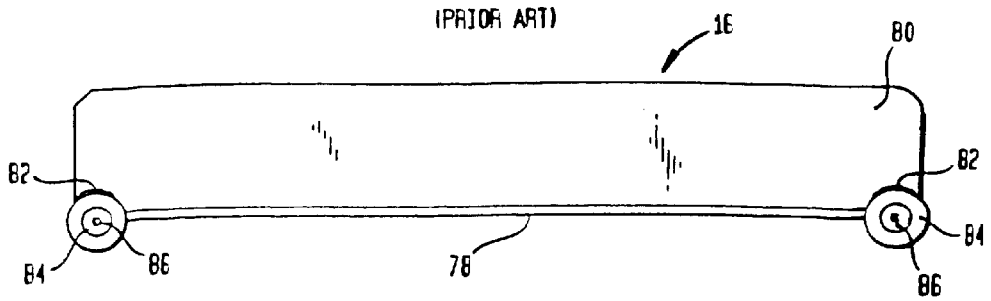
FIGS. 5a and 5b illustrate the lower channel of an extension arm, in accordance with the prior art.
Figure 5B:
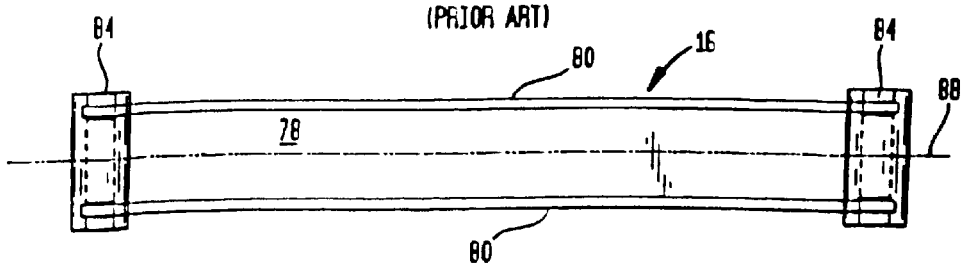
Figure 6:
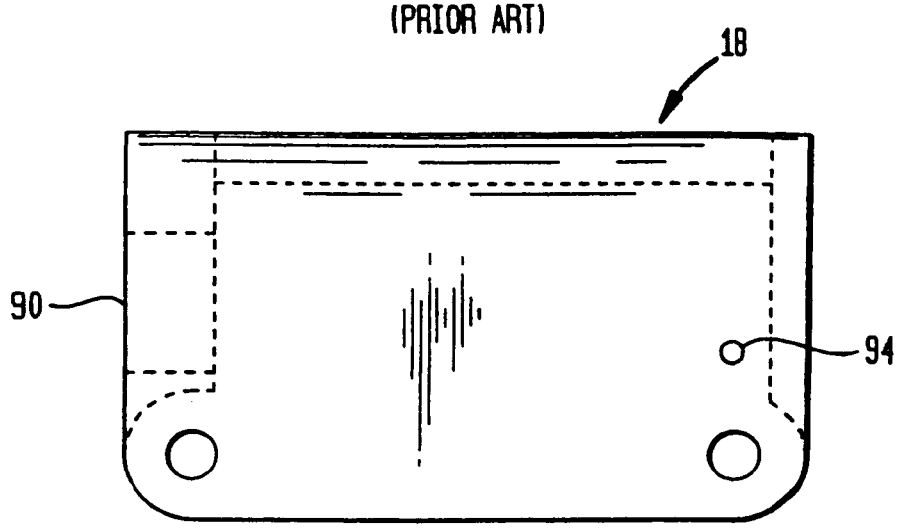
FIG. 6 illustrates a second endcap of an extension arm, in accordance with the prior art.
Figure 7:
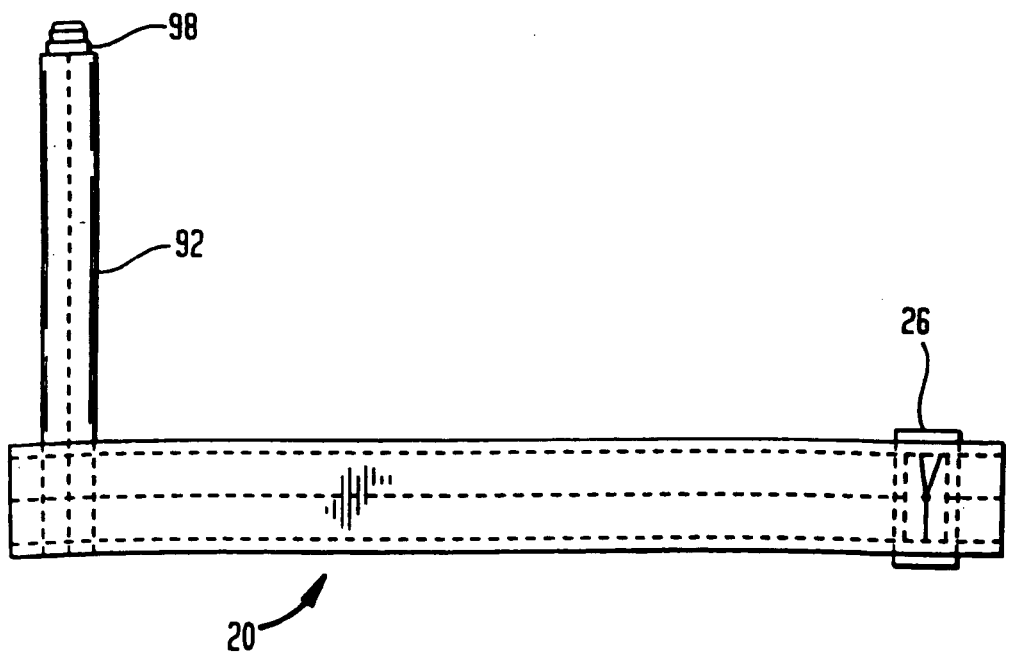
FIG. 7 illustrates a forearm extension of an extension arm, in accordance with the prior art.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 8 through 17 in particular, the apparatus of the present invention is disclosed. Embodiments of an extension arm suitable for mounting a flat-screen electronic peripheral device, such as a computer monitor or television, that is inexpensive and easy to manufacture and assemble, and permits a flat-screen device to be mounted substantially flush with a mounting surface is described in U.S. Provisional Patent Application No. 60/133,378 filed May 10, 1999 entitled "Arm Apparatus For Mounting Electronic Devices", the disclosure of which is incorporated herein in its entirety. The current invention discloses embodiments that enable the extension arm to substantially hide from view the cables to and from the flat-screen electronic peripheral device within the extension arm.

Figure 8:
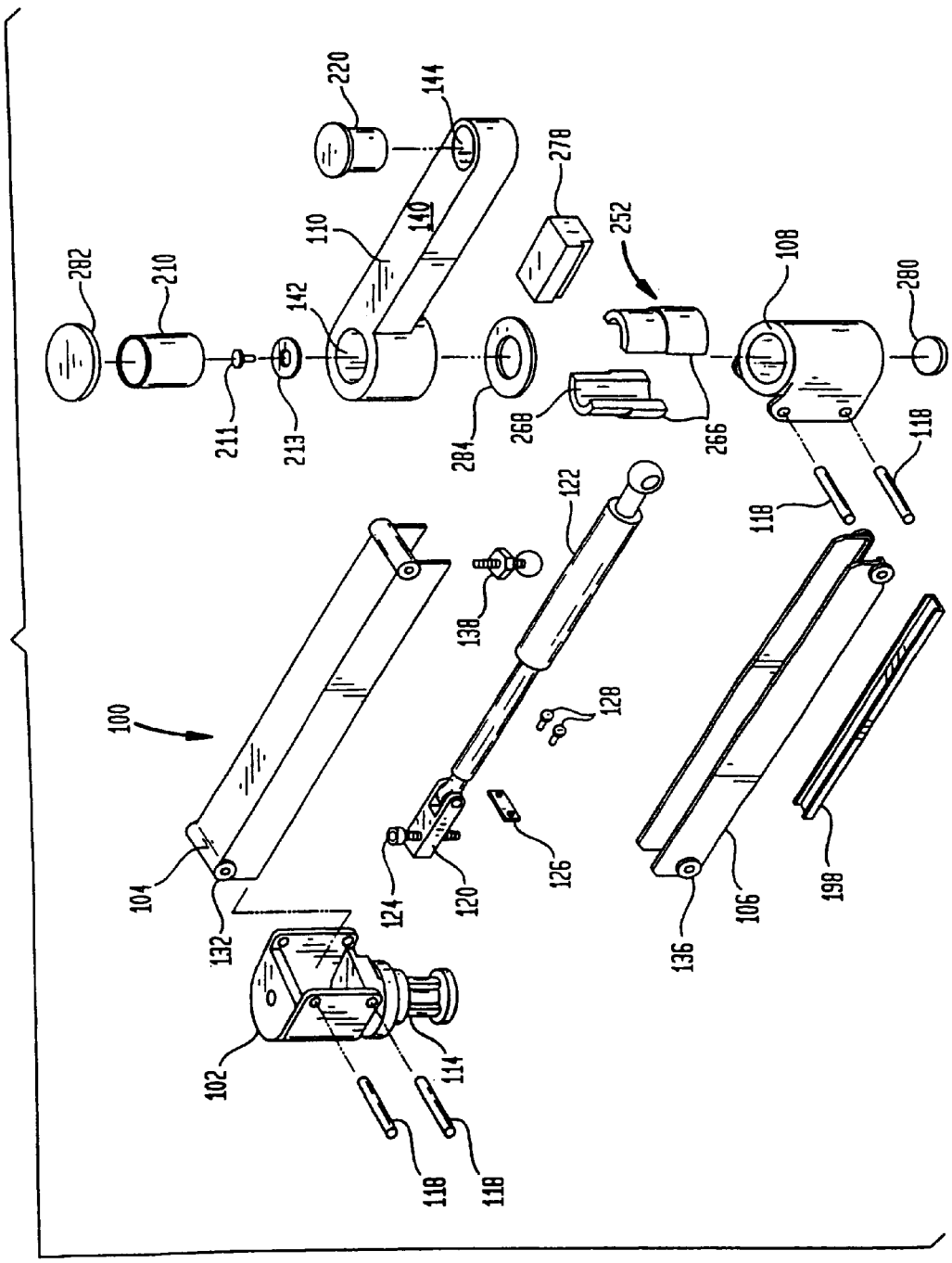
FIG. 8 is an exploded assembly drawing of an extension arm having an interior cable management system for adjustably mounting a flat-screen device to a support mount, according to one embodiment of the invention.
Figure 9:
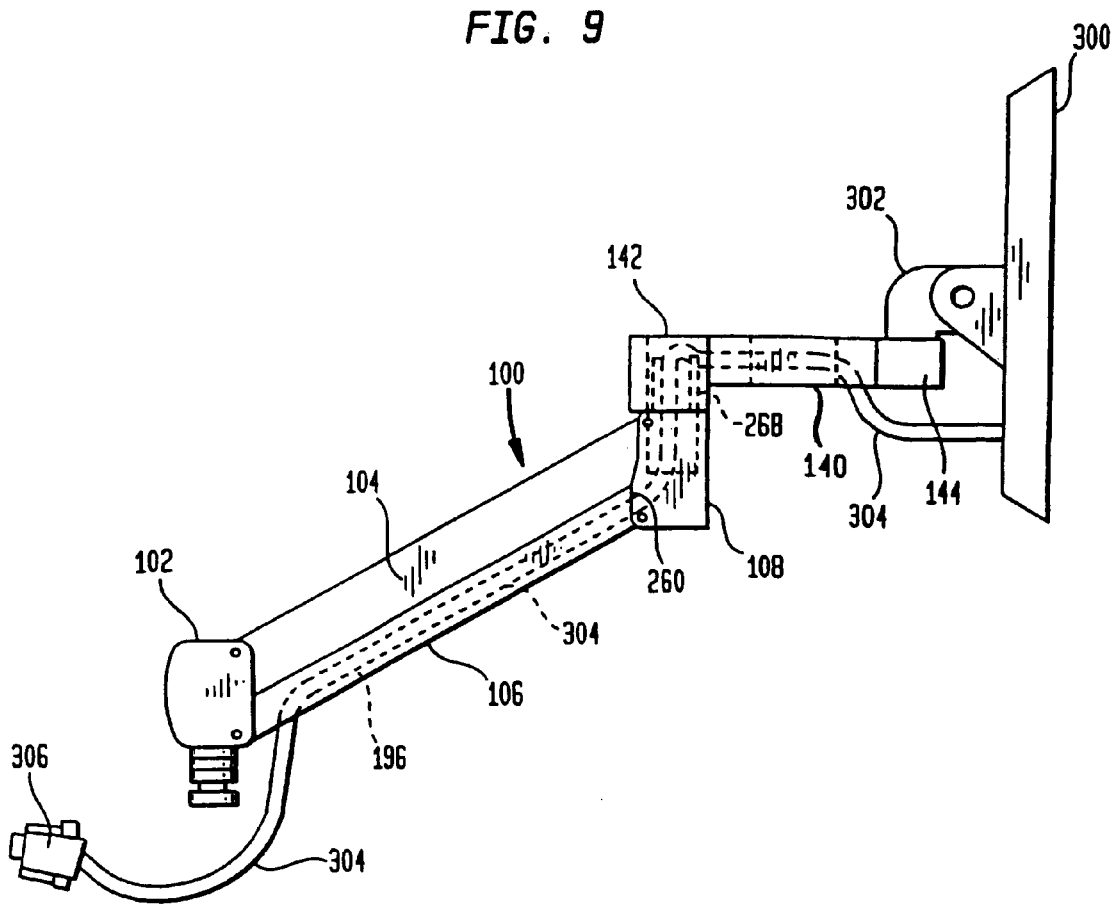
FIG. 9 is a side view of an extension arm with an interior cable management system.

FIG. 8 is an exploded assembly drawing of an extension arm 100 in accordance with one embodiment. The extension arm 100 comprises a first endcap 102, an upper channel 104, a lower channel 106, a second endcap 108, and a forearm extension 110. FIG. 9 illustrates how cables to and from the device are disposed within the lower channel 106, the second end cap 108, and the forearm extension 110 of the extension arm 100 so as to be hidden from view. FIG. 9 will be discussed in more detail later.

Figure 10A:
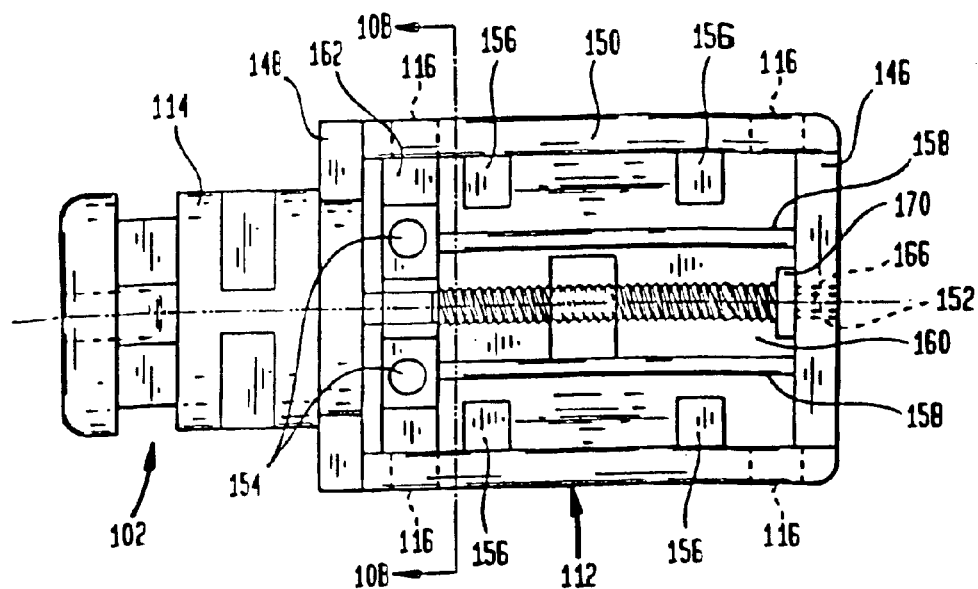
FIGS. 10A–D illustrate several views of a first endcap, in accordance with one embodiment of the invention.
Figure 10B:
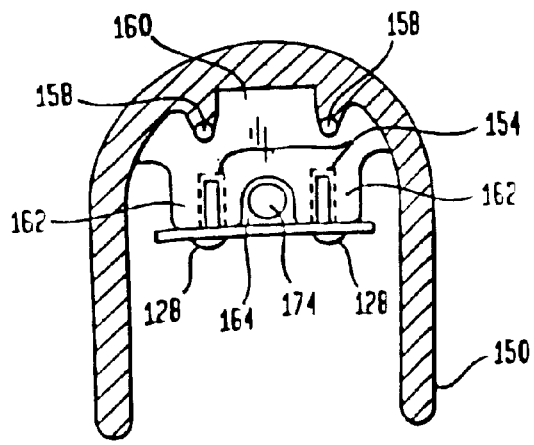

FIGS. 10A and 10B illustrate the first endcap 102, in accordance with one embodiment of the invention. In the embodiment shown, the first endcap 102 includes a partially-enclosed housing 112 which has flat, oppositely-disposed endwalls 146 and 148 fixedly connected by a sidewall 150. The sidewall 150 extends partially around the partially-enclosed housing 112 so as to permit manipulation of components to be assembled within the first endcap 102. In one embodiment, the endwalls 146 and 148 are semicircular in shape and are connected along a semicircular edge to the sidewall 150, which extends perpendicularly therebetween.

FIG. 10A illustrates the first endcap 102 having a shaft 114 disposed on the endwall 148. The shaft 114 is preferably integrally molded to the endwall 148 of the first endcap 102. Preferably the entire first endcap 102 (the partially enclosed housing 112 and the shaft 114) is molded from zinc. The endwall 146 has a hole 152 disposed therethrough. Within the partially enclosed housing 112 and integrally molded on the sidewall 150 are stops 156 disposed in proximity to the endwalls 146, 148; trough walls 158 disposed longitudinally along the inner surface of the sidewall 150 between the endwalls 146 and 148 so as to define a trough 160 therebetween; and shelves 162 disposed adjacent to the endwall 148.

The stops 156 serve to stop upward or downward movement of the extension arm 100 when ends of the upper channel 104 and the lower channel 106, respectively, meet the stops 156 when the extension arm 100 is in extended positions. The trough 160 disposed between the trough walls 158 allows a clevis 120 to be moved therein, as discussed in more detail later. FIG. 10B illustrates the shelves 162 defining co-planar faces separated by a groove 164. The shelves 162 have a connection means, such as self-tapping screw holes 154 disposed therein. The co-planar faces of the shelves 162 are configured to engage a retainer clip 126, which is fastened in place by, for example, a pair of screws 128. When the retainer clip 126 is fastened in place, the groove 164 defines a spacing for accepting one end of a threaded rod 124, as discussed in more detail below.

Figure 10C:
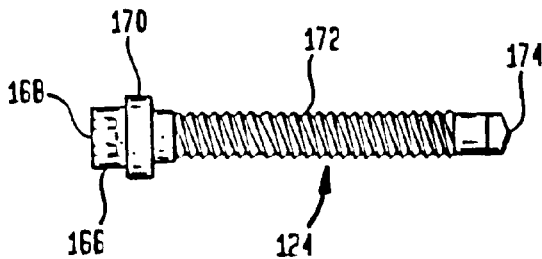

The threaded rod 124 and the clevis 120 are now fabricated and assembled in the first endcap 102. The threaded rod 124 is employed within the first endcap 102 so as to adjustably support the clevis 120. FIG. 10C illustrates the threaded rod 124 having a first end 166 which has a circular cross-section within which is axially disposed a shaped opening 168, for example a hex-shaped opening, for accepting a shaped key (not shown), such as a hex-shaped key. Advantageously, a cross-sectional diameter of the first end 166 is smaller than a cross-sectional diameter of the hole 152, so as to be inserted therein. Adjacent the first end 166 is a shoulder 170. Advantageously, the shoulder 170 has a circular cross-section having a diameter that is larger than the cross-sectional diameter of the hole 152. Thus, in a preferred embodiment, the shoulder 170 abuts an inner surface of the endwall 146 and retains the first end 166 within the hole 152.

The threaded rod 124 also includes a threaded section 172 which is configured to threadingly engage the clevis 120. A second end 174 of threaded rod 124 is disposed in the groove 164 located between the shelves 162 of the first endcap 102. Preferably, the second end 174 of the threaded rod 124 has a circular cross-section having a diameter that is smaller than the size of the groove 164, such that the second end 174 is supported between the shelves 162 but is free to rotate therein.

Figure 10D:
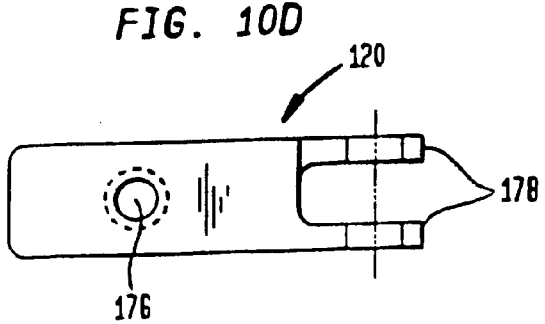

As previously mentioned, threadedly mounted on the rod 124 is the clevis 120. The clevis 120 as illustrated in FIG. 10D, has a tapped hole 176 formed therein for receiving the threaded rod 124. The clevis 120 also has a pair of fastening members 178 at a first end to which are fastened a first end of a gas spring 122. The second end of the clevis 120 is configured to slidably engage the trough 160.

When the first end 166 of the threaded rod 124 is engaged by a shaped key, the shaped key is employed so as to rotate the threaded rod 124 around its axial centerline. When the threaded rod 124 is rotated around this axis of rotation, the clevis 120 moves along the length of the threaded rod 124 in a direction that corresponds to the direction which the shaped key is turned. This movement of the clevis 120 permits the gas spring 122 to be adjusted.

The partially enclosed housing 112 is configured with, for example, holes 116 to receive a connection mechanism, such as pins 118, therethrough. The shaft 114 is configured to be inserted for pivotable rotation in a support mount (not shown), which may be a wall, desk or pole mount, or a configurable mount as shown and described in Applicant's co-pending patent applications: Provisional Patent Application No. 60/106,729 filed on Nov. 2, 1998 and Provisional Patent Application No. 60/108,469 filed on Nov. 14, 1998.

FIGS. 11a–d illustrate several views of the upper channel 104, according to one embodiment of the invention. The upper channel 104 includes a U-shaped body 130 having a longitudinal axis 188 and integrally cast rollers 132 disposed at opposite ends of the U-shaped body 130. The U-shaped body 130 comprises a channel bottom 180 from which extend two channel sidewalls 182. The channel bottom 180, the sidewalls 182 and the rollers 132 of the upper channel 104 are preferably integrally cast from zinc, which gives the upper channel 104 a lesser weight, and a degree of structural rigidity, more suitable for lighter-weight flat-screen devices than the prior art upper channel 14 which is stamped from heavy gauge steel. The rollers 132 have a hole 184 therethrough (either cast or subsequently drilled) for receiving a connection mechanism, such as the pins 118. Additionally, the upper channel 104 comprises a threaded hole 186 configured and sized to receive a threaded end of a ball stud 138. The threaded hole 186 is also integrally cast. The ball stud 138 is configured and sized to receive a second end of the gas spring 122.

Unlike the prior art upper channel 14 in which the U-shaped channel is formed by heating a piece of steel and bending the steel to form the channel bottom 60 and the sidewalls 62, the upper channel 104 of the invention is cast molded. The use of cast molding ensures the angle between the channel bottom 180 and the sidewalls 182 is exactly the same each and every time. Moreover, cast molding enables the sidewalls 182 to be tapered. As illustrated in FIGS. 11C and 11D, both an outer surface and an inner surface of the sidewalls 182 may taper in, for example, by approximately 1 degree. It should be noted that the taper is not limited to 1 degree, and that the taper of the inner surface and the outer surface need not be the same. The taper provides several advantages including more clearance between the upper and the lower channels 104, 106 when the upper and the lower channels 104, 106 are brought together during usage. That is, the inner surface of the sidewalls 182 being displaced by 1 degree means that there will be additional clearance for the lower channel 106 to fit therewithin. The additional clearance will help prevent the upper channel 104 and the lower channel 106 from scraping together.

FIGS. 12a–e illustrate several views of the lower channel 106, according to one embodiment of the invention. The lower channel 106 includes a U-shaped body 134 having a longitudinal axis 200 and integrally cast rollers 136 disposed at opposite ends of the U-shaped body 134. The U-shaped body 134 of the lower channel 106 comprises a channel bottom 190 from which extend two channel sidewalls 192. The channel bottom 190, the sidewalls 192 and the rollers 136 of the lower channel 106 are Preferably integrally cast from zinc, which gives the lower channel 106 a lesser weight when compared to heavy gauge steel, and a degree of structural rigidity, more suitable for lighter-weight flat-screen devices. The rollers 136 have a hole 194 therethrough (either cast or subsequently drilled) for receiving a connection mechanism, such as the pins 118.

The channel bottom 190 additionally includes a cable channel 196 running longitudinally therealong. In the embodiment shown, a first end 197 of the cable channel 196 starts near an end of the channel bottom 190 that pivotably connects to the first endcap 102. The cable channel 196 then runs along the entire length of the channel bottom 190 to the end of the channel bottom 190 that pivotably connects to the second endcap 108. Thus, the second end 199 of the cable channel 196 is an opening between the roller 136 at the end of the channel bottom that pivotably connects to the second endcap 108. The first end 197 may be, for example, rounded to improve the rigidity of the lower channel 106. The cable channel 196 is configured to receive a cable cover 198 (illustrated in FIG. 12E) which is configured to removably fit within the cable channel 196. Thus, cables of the mounted device may be substantially retained within the lower channel 106 so as to hide them from view and protect them from harm. The cable channel 196 and the cable cover 198 enable cables to be accessed when desired, while securing them within the lower channel 106.

Figure 12A:
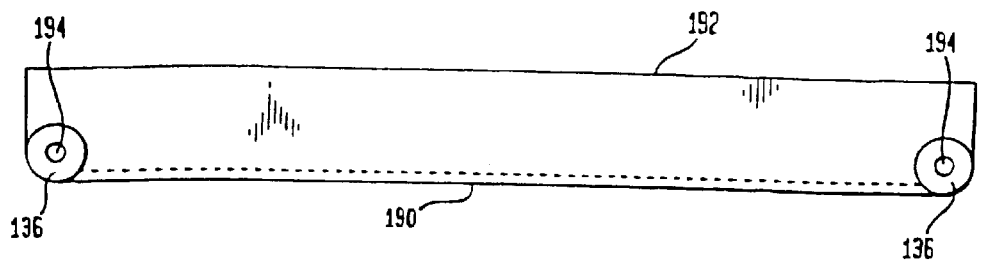
FIGS. 12A–E illustrate several views of a lower channel, according to one embodiment of the invention.
Figure 12B:
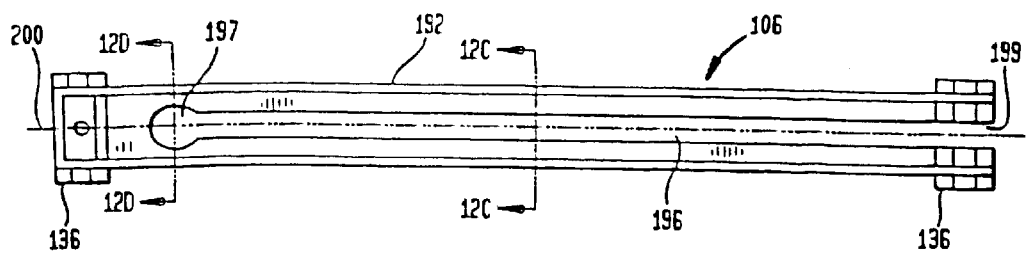
Figure 12C:
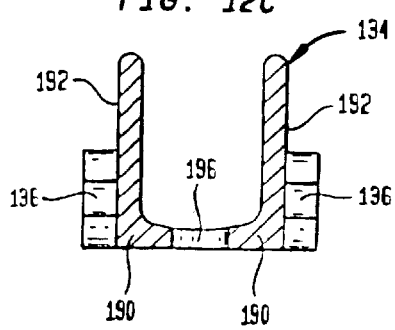
Figure 12D:
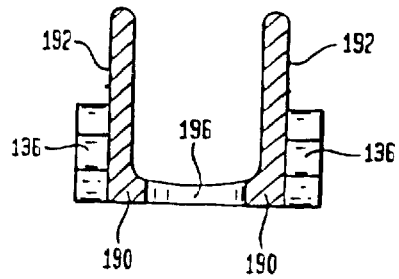

As illustrated in FIGS. 12C and 12D the sidewalls 192 of the lower channel 106 are tapered. For example, an outer surface of the sidewalls 192 may be tapered approximately ½ degree while an inner surface may be tapered approximately 1 degree. It should be noted that the taper is not limited to a particular angle, and that the taper of the inner surface and the outer surface may be the same. The taper is possible because the lower channel 106 is, in the preferred embodiment, cast molded. As noted above with respect to the upper channel 104, the taper provides more clearance between the upper channel 104 and the lower channel 106 so as to reduce or eliminate the chance of the upper and the lower channels 104, 106 scraping.

Figure 12E:
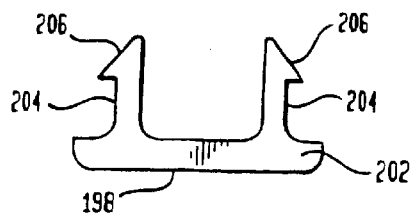

As illustrated in FIG. 12E, the cable cover 198 includes a top cover 202 with two sidewalls 204 protruding therefrom. A far end of each sidewall 204 has a catch 206 formed thereon so as to engage with the cable channel 196.

Figure 13A:
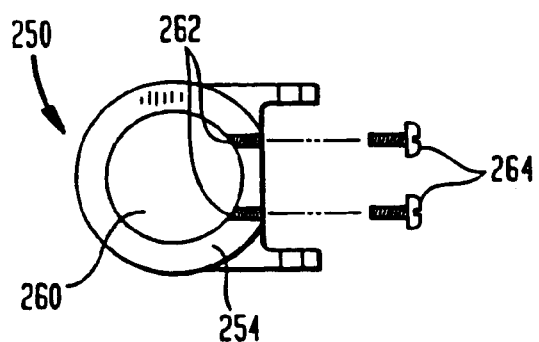
FIGS. 13A–C illustrate several views of a partially enclosed housing of a second endcap, according to one embodiment of the invention.
Figure 13B:
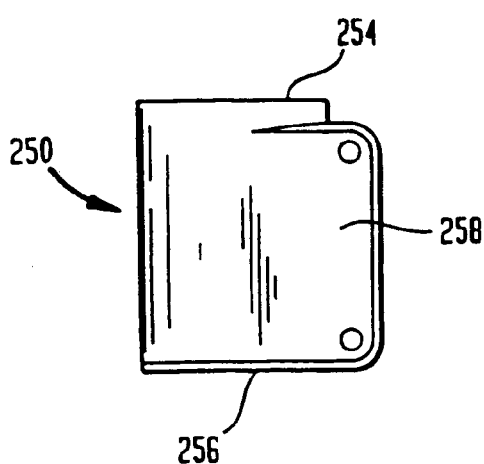
Figure 13C:
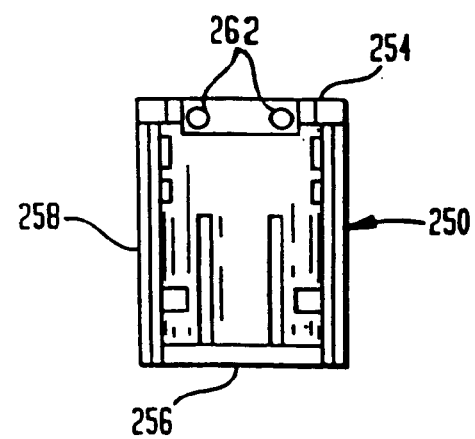

The second endcap 108 includes a partially enclosed housing 250 and a shaft assembly 252. As illustrated in FIGS. 13A–C, the partially enclosed housing 250 has a first endwall 254 and a second endwall 256 oppositely-disposed from each other and fixedly connected by a sidewall 258. The sidewall 258 extends partially around the partially-enclosed housing 250 so as to permit manipulation of components, such as cables, which may be contained therewithin. The first endwall 254 has a hole 260 disposed therethrough and threaded holes 262 disposed therein that are in communication with the hole 260. Disposed with the threaded holes 262 are set screws 264. Preferably, the diameter of the hole 260 is large enough to allow a plug end of a cable to fit therethrough.

Figure 14A:
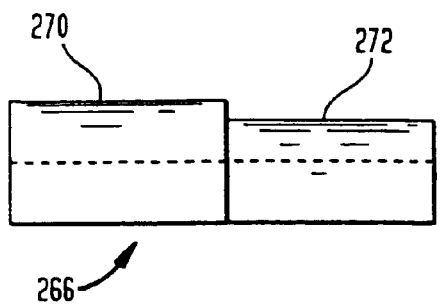
FIGS. 14A–C illustrates several views of a shaft assembly of a second endcap, according to one embodiment of the invention.
Figure 14B:
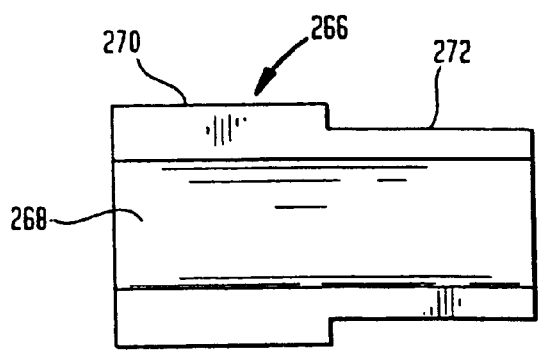
Figure 14C:
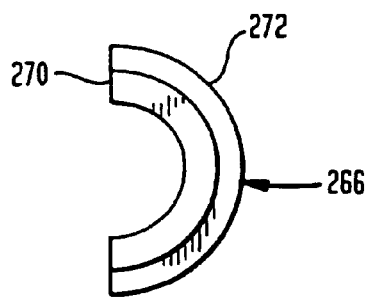
Figure 15:
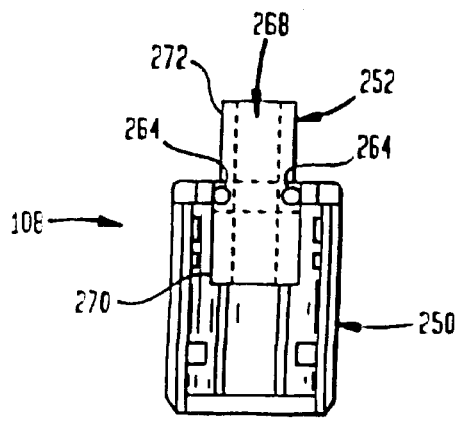
FIG. 15 illustrates an assembled second endcap according to one embodiment of the invention.

As illustrated in FIGS. 14A–C, the shaft assembly 252 preferably includes two symmetrical endcap adapters 266 which when assembled provide a hollow shaft 268. The endcap adapters 266 have a mounting end 270 and a shaft end 272 that is thinner than the mounting end 270. As illustrated in FIG. 15, the mounting end 270 of both of the endcap adapters 266 are inserted into the hole 260 and are coupled together and to the partially enclosed housing 250, to form the second endcap 108, by tightening the set screws 264.

The upper and the lower channels 104, 106 and the first and the second endcaps 102, 108 are configured so as to form an adjustable parallelogram. When configured, the shaft 114 of the first endcap 102 and the hollow shaft 268 of the second endcap 108 point in opposite directions. For example, as illustrated in FIG. 8, the shaft 114 of the first endcap 102 extends vertically downward while the hollow shaft 268 of the second endcap 108 extends vertically upward. The shape of the parallelogram is retained by the gas spring 122. As previously mentioned, the first end of the gas spring 122 is attached to the ball stud 138 mounted within the upper channel 104 and the second end is adjustably mounted to the clevis 120 within the first endcap 102. Generally, the gas spring 122 is sized so as to have a fixed length until an upward or downward force is exerted at the second endcap 108 that exceeds the gas spring's designed resistance. Thus, the gas spring 122 retains the parallelogram shape when the only force exerted at the second endcap 108 is the weight of the flat-screen device. However, the gas spring 122 permits the parallelogram shape to be adjusted when a user pushes the flat-screen device coupled to the forearm extension 110 up or down.

Figure 16A:
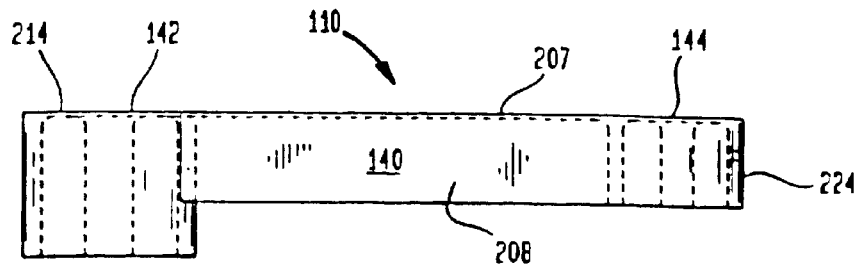
FIGS. 16A and 16B illustrate a forearm extension, in accordance with one embodiment of the invention.
Figure 16B:
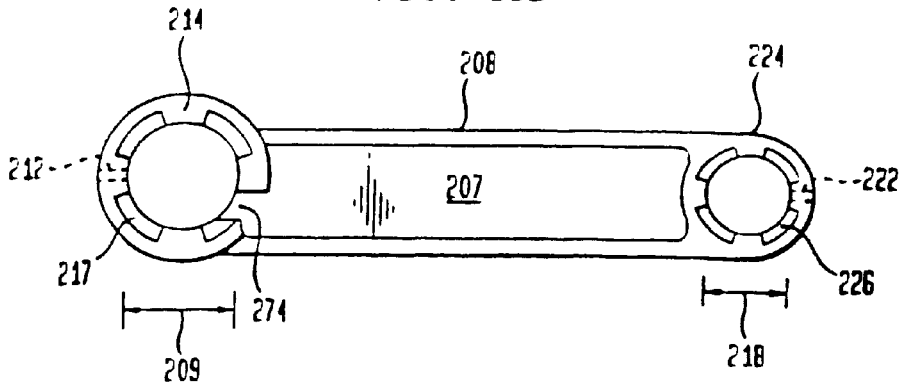

With reference to FIGS. 16A and 16B, the forearm extension 110 includes a body 140 having a first female coupling 142 located on a first end and a second female coupling 144 located on a second end. The first female coupling 142 has an inner diameter 209 that is sized to rotatably engage the hollow shaft 268 of the second endcap 108. The first female coupling 142 is also configured to receive a cable through the hollow shaft 268. That is, the first female coupling 142 has a cable slot 274 formed therein, for example by milling the cable slot 274 into the first female coupling 142, or by casting the first female coupling 142 with the cable slot 274 integrally formed therein.

The first female coupling 142 preferably has a set screw 212 formed within a wall 214 thereof. The set screw 212 can be tightened to prevent the first female coupling 142 from rotating about the hollow shaft 268. Advantageously, the first female coupling 142 has a plurality of voids 217 formed in the wall 214, which saves on material costs and permits the forearm extension 110, when cast, to be cooled more quickly. The quicker cooling enables the production quantity to be increased.

Figure 17A:
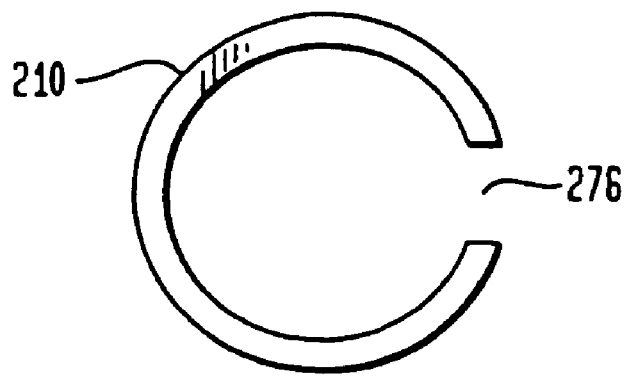
FIGS. 17A–B, illustrate several views of a bushing used in a second female coupling of the extension arm illustrated in FIGS. 16A–B.
Figure 17B:
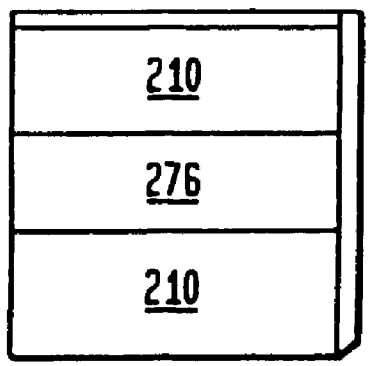

A bushing 210 (FIG. 8) is preferably used to engage the first female coupling 142 and the hollow shaft 268. That is, the bushing 210 is placed over the hollow shaft 268 and within the first female coupling 142. The bushing 210 is preferably made of a smooth material, such as plastic, in order to reduce friction and prevent metal to metal contact. As illustrated in FIGS. 17A and 17B, the bushing 210 also has a cable slot 276 formed therein. The cable slots 274, 276 are aligned so that a cable can pass therethrough. When the set screw 212 is tightened it causes the bushing 210 to flex inward and frictionally engage the hollow shaft 268 and thus prevent the forearm extension 110 from rotating about the hollow shaft 268. The hollow shaft 268 and the first female coupling 142 are held together by utilizing a screw 211 and a washer 213 (FIG. 8).

The body 140 preferably has an inverted U-shape with a topwall 207 and two sidewalls 208 so that a cable can be hidden therein. Advantageously attached within the U-shaped body 140, and preferably on the topwall 207, is a cable holder 278 (FIG. 8). The cable holder 278 secures a cable within the U-shaped body so that it can be hidden from view as it travels the length of the forearm extension 110.

The second female coupling 144 is for attachment to a device mounting (not shown), such as a tilter (described in Applicant's co-pending Provisional Patent Application No. 60/137,088 filed on Jun. 2, 1999), a platform, or other means for supporting a flat-screen device. Thus, the second female coupling 144 has an inner diameter 218 that is sized to rotatably engage a shaft of the device mount. A bushing 220 (FIG. 8), preferably made of a smooth material such as plastic, is placed over the shaft and within the second female coupling 144. The second female coupling 144 preferably has a set screw 222 formed within a wall 224 of the second female coupling 144. When the set screw 222 is tightened it causes the bushing 220 to flex inward and frictionally engage the shaft and thus prevent the device mount from rotating around the second female coupling 144. Advantageously, the second female coupling 144 also has a plurality of voids 226 formed in the wall 224.

The embodiment of the forearm extension 110 illustrated in FIGS. 16a and 16b, has the topwall 207 flush with an upper edge of the female couplings 142, 144. Since the first female coupling 142 is larger than the second female coupling, the center of the first female coupling 142 is not aligned with the center of the second female coupling 144 or an axial centerline of the body 140. It should be noted that an alternative embodiment is to have the center of the female couplings 142, 144 and the axial centerline of the body 140 all aligned, so that the topwall 207 would not be aligned with an upper edge of the first female coupling 142.

The embodiment illustrated in FIG. 16A, has the body 140 horizontally disposed between the female couplings 142, 144 when the axial centerlines of the female couplings 142, 144 are vertically disposed. It should be noted however that the body 140 is not limited to be horizontally disposed and may be disposed at an incline in this embodiment.

The present invention permits a flat-screen device which is mounted to a wall to be flattened against the wall while hiding the extension arm 100 within the shadow of the device. That is, the forearm extension 110 may be folded into a position which is directly above the upper and the lower channels 104, 106 As a result, the mounted device is flush to the mounting surface and substantially hides the parallelogram, formed by the first and the second endcaps 102, 108 and the upper and the lower channels 104, 106, as well as the forearm extension 110 from view. Thus, the aesthetic appeal of the extension arm 100 is increased and the space occupied by the extension arm 100 and the device is minimized.

Referring back to FIG. 9, a flat screen monitor 300 is attached to a tilter 302 which is rotatably coupled to the second female coupling 144. A cable 304, such as a power cable, proceeds from the monitor 300 to the underside off the U-shaped body 140 of the forearm extension 110. The cable 304 is held in place within the U-shaped body 140 by the cable holder 278. The cable 304 proceeds from the body through the cable slots 274, 276 in the bushing 210 and the first female coupling 142. The cable then proceeds through the hollow shaft 268 of the second endcap 108. The cable exits the second endcap 108 through the open end of the partially enclosed housing 260. The cable proceeds down the length of the lower channel 106 and exits at the first end 197 of the cable channel 196.

Preferably, the cable 304 is inserted into the extension arm 100 as portions of the extension arm 100 are being assembled. That is, the cable 304 is placed under the U-shaped body 140 of the forearm extension 110 and is held in place by the cable holder 278. The cable is then passed through the cable slots 274, 276. The cable 304 including the plug 306 is then fed through the hole 260 in the second endcap 108. The second endcap 108 is now assembled by inserting the mounting end 270 of each endcap adapter 268 into the hole 260, thus surrounding the cable 304. The endcap adapters 268 are held together and within the hole 260 by tightening the set screws 264. The hollow shaft 268 is then placed within the first female coupling 142. The cable 304 is placed within the lower channel 106, prior to the lower channel 106 and the second endcap being secured together. This ensures that the cable 304 is above the roller 136 and is contained within the hollow bar formed by the upper channel 104 and the lower channel 106.

Referring back to FIG. 8, several additional components of the extension arm 100 are discussed. For aesthetic purposes, a bumper 280 may be placed on the second endwall 256 of the second endcap 108 and a plug 282 may be placed over the first female coupling 142. A washer 284 may be placed over the two endcap adapters 268 to help secure them together.

Although this invention has been illustrated by reference to specific embodiments, it will be apparent to those skilled in the art that various changes and modifications may be made that clearly fall within the scope of the invention. The invention is intended to be protected broadly within the spirit and scope of the appended claims.

What is claimed is:

1. A channel for use in an extension arm that adjustably mounts a device to a support mount and conceals cables to and from the device within said channel, said channel comprising an elongated body; a first roller disposed at a first end of said body; a second roller disposed at a second end of said body; and a cable channel formed within said body that runs longitudinally therealong from a location adjacent to the first end of said channel to the second end of said body so as to pass through said second roller and to form an opening in the second end of said body.

2. The channel of claim 1, wherein said cable channel has two opposite edges that are parallel to a longitudinal centerline of said body.

3. The channel of claim 1, wherein one end of said cable channel is rounded.

4. The channel of claim 1, further comprising a cable cover that is removably attachable to said cable channel.

5. The channel of claim 1, wherein each of said rollers have holes located at a respective axial centerline.

6. The channel of claim 1, wherein said body is U-shaped in cross-section.

7. The channel of claim 1, wherein said body includes a pair of spaced apart tapered sidewalls.

8. A channel for use in an extension arm that adjustably mounts a device to a support mount and conceals cables to and from the device within said channel, said channel comprising a U-shaped body including a pair of spaced apart side walls and a bottom wall; a first roller disposed at a first end of said body; a second roller disposed at a second end of said body; and a cable channel formed within said bottom wall extending longitudinally from a location adjacent the first end of said channel to the second end of said body, said cable channel extending through said second roller to form an opening therein.

9. The channel of claim 8, wherein said cable channel has two opposite edges that are parallel to a longitudinal centerline of said body.

10. The channel of claim 8, wherein one end of said cable channel is rounded.

11. The channel of claim 8, wherein further comprising a cable cover that is removably attachable to said cable channel.

12. The channel of claim 8, wherein said pair of spaced apart side walls are tapered.

* * * * *

UNITED STATES PATENT AND TRADEMARK OFFICE
CERTIFICATE OF CORRECTION

PATENT NO.   : 6,719,253 B2
DATED        : April 13, 2004
INVENTOR(S)  : Odd N. Oddsen Jr.

It is certified that error appears in the above-identified patent and that said Letters Patent is hereby corrected as shown below:

Title page,
Item [57], delete entire ABSTRACT and insert -- A channel for use in an extension arm for adjustably mounting a device thereto. The channel includes an elongated body having a first roller disposed at a first end thereof. A cable channel is formed within the body that runs longitudinally from an opening in the second end of the body. --

Column 7,
Line 46, "Preferably" should read -- preferably --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,719,253 B2
DATED : April 13, 2004
INVENTOR(S) : Odd N. Oddsen Jr.

It is certified that error appears in the above-identified patent and that said Letters Patent is hereby corrected as shown below:

<u>Title page,</u>
Item [57], delete entire ABSTRACT and insert -- A channel for use in an extension arm for adjustably mounting a device thereto. The channel includes an elongated body having a first roller disposed at a first end thereof and a second roller disposed at a second end thereof. A cable channel is formed within the body that runs longitudinally from a location adjacent the first end to the second end so as to pass through the second roller and to form an opening in the second end of the body. --

<u>Column 7,</u>
Line 46, "Preferably" should read -- preferably --.

This certificate supersedes Certificate of Correction issued July 20, 2004.

Signed and Sealed this

Twenty-fourth Day of May, 2005

JON W. DUDAS
*Director of the United States Patent and Trademark Office*